US011360966B2

(12) United States Patent
Ozawa

(10) Patent No.: US 11,360,966 B2
(45) Date of Patent: Jun. 14, 2022

(54) INFORMATION PROCESSING SYSTEM AND METHOD OF CONTROLLING INFORMATION PROCESSING SYSTEM

(71) Applicant: HITACHI, LTD., Tokyo (JP)

(72) Inventor: Yoji Ozawa, Tokyo (JP)

(73) Assignee: HITACHI, LTD., Tokyo (JP)

( * ) Notice: Subject to any disclaimer, the term of this patent is extended or adjusted under 35 U.S.C. 154(b) by 160 days.

(21) Appl. No.: 16/817,809

(22) Filed: Mar. 13, 2020

(65) Prior Publication Data

US 2020/0379982 A1 Dec. 3, 2020

(30) Foreign Application Priority Data

May 31, 2019 (JP) .............................. JP2019-103187

(51) Int. Cl.
*G06F 16/20* (2019.01)
*G06F 16/23* (2019.01)
*G06F 16/27* (2019.01)

(52) U.S. Cl.
CPC .......... *G06F 16/2379* (2019.01); *G06F 16/27* (2019.01)

(58) Field of Classification Search
None
See application file for complete search history.

(56) References Cited

U.S. PATENT DOCUMENTS

| 2017/0295232 | A1 | 10/2017 | Curtis | |
|---|---|---|---|---|
| 2019/0188700 | A1* | 6/2019 | August | H04L 9/3239 |
| 2020/0267187 | A1* | 8/2020 | Singh | G06F 21/54 |
| 2021/0160056 | A1* | 5/2021 | Yan | G06F 21/602 |

* cited by examiner

*Primary Examiner* — Jau Shya Meng
(74) *Attorney, Agent, or Firm* — Volpe Koenig

(57) ABSTRACT

An information processing system includes a plurality of distributed ledger nodes provided to a plurality of organizations, and configured to verify a content of a transaction with each other and hold a history of the transaction in distributed ledgers provided to the organizations, a client node configured to transmit the transaction to the distributed ledger nodes, and a plurality of processing nodes provided to the organizations, and configured to execute verification target processing being processing that is targeted for verification on a virtual platform. The client node selects the distributed ledger nodes to perform the verification of the verification target processing and transmits the transaction including a request to execute the verification target processing to each of the selected distributed ledger nodes. When each selected node receives the transaction, the distributed ledger node causes the processing node in the organization to perform the verification and records the verification result.

10 Claims, 21 Drawing Sheets

DATA FLOW INFORMATION 451

| DATA FLOW ID 4511 | CREATOR ORGANIZATION 4512 | CREATED DATE AND TIME 4513 | DELETED DATE AND TIME 4514 | INPUTTED DATASET ID 4515 | PROCESSING CONTAINER ID 4516 | OUTPUTTED DATASET ID 4517 | STATUS 4518 |
|---|---|---|---|---|---|---|---|
| 1 | ORGANIZATION B | 2019/3/10 01:23:45 | N/A | 1 | 1 | 2 | ACTIVE |
| 2 | ORGANIZATION C | 2019/3/11 02:34:56 | N/A | 2 | 2 | 3 | ACTIVE |

FIG. 11

DEPLOYMENT LOG 151

| DEPLOYMENT LOG ID (1511) | CREATED DATE AND TIME (1512) | CREATOR CONTAINER ID (1513) | IMAGE ID (1514) |
|---|---|---|---|
| 1 | 2019/3/10 01:23:50 | 1 | 1 |
| 2 | 2019/3/11 02:35:00 | 2 | 2 |

FIG. 12

CONTAINER INFORMATION 125

| CONTAINER ID (1251) | IMAGE ID (1252) | STATUS (1253) |
|---|---|---|
| 1 | 1 | IN OPERATION |
| 2 | 2 | IN OPERATION |

FIG. 13

CONTAINER LOG 126

| CONTAINER LOG ID 1261 | CONTAINER ID 1262 | LOG INFORMATION 1263 |
|---|---|---|
| 1 | 1 | 2019/3/10 1:24:00, DATA 21 (VALUES:["val":100, "result":"OK"]) IS CREATED FROM DATA 11 (VALUES:100,300,0) (SUB-DATASET 11) AND STORED IN SUB-DATASET 21<br>2019/3/10 1:24:01, DATA 22 (VALUES:["val":20, "result":"NG"]) IS CREATED FROM DATA 12 (VALUES:20,310,1) (SUB-DATASET 11) AND STORED IN SUB-DATASET 21<br>2019/3/11 0:00:01, DATA 23 (VALUES:["val":110, "result":"OK"]) IS CREATED FROM DATA 13 (VALUES:110,310,0) (SUB-DATASET 12) AND STORED IN SUB-DATASET 22<br>2019/3/11 0:01:01, DATA 24 (VALUES:["val":120, "result":"OK"]) IS CREATED FROM DATA 14 (VALUES:120,310,0) (SUB-DATASET 12) AND STORED IN SUB-DATASET 22 |
| 2 | 2 | 2019/3/11 2:35:10, DATA 31 (VALUES:["period":"3/11", "result":"ALL OK"]) IS CREATED FROM DATA 23 (VALUES:["val":110, "result":"OK"]) TO DATA 26 (SUB-DATASET 22) AND STORED IN SUB-DATASET 31 |

| DATASET ID | SUB-DATASET ID | ACQUISITION PERIOD |
|---|---|---|
| 1 | 11 | 2019/3/10 0:00:00 – 2019/3/10 23:59:59 |
| 1 | 12 | 2019/3/11 0:00:00 – 2019/3/11 23:59:59 |
| 2 | 21 | 2019/3/10 0:00:00 – 2019/3/10 23:59:59 |
| 2 | 22 | 2019/3/10 0:00:00 – 2019/3/10 23:59:59 |

VERIFYING PARTY DETERMINATION PROCESSING NODE INFORMATION 215

| PROCESSING NODE INFORMATION ID | ORGANIZATION ID | ACCESSIBLE DATASET | CURRENTLY USED DATASET | VERIFICATION IMPLEMENTATION REQUIRED POINTS |
|---|---|---|---|---|
| 1 | ORGANIZATION A | 1 | N/A | 10 |
| 2 | ORGANIZATION B | 1, 2, 3 | 2 | 20 |
| 3 | ORGANIZATION C | 1, 2, 3 | 2, 3 | 15 |

VERIFYING PARTY DETERMINATION PARAMETER INFORMATION 216

| PARAMETER INFORMATION ID (2161) | PARAMETER (2162) | PARAMETER VALUE (2163) |
|---|---|---|
| 1 | VERIFICATION NODE (DEPLOYMENT) MAXIMUM NUMBER | 5 |
| 2 | VERIFICATION NODE (DATA INPUT) MAXIMUM NUMBER | 4 |

FIG. 18

ORGANIZATION INFORMATION 217

| ORGANIZATION ID (2171) | ORGANIZATION NAME (2172) | DISTRIBUTED LEDGER NODE ID (2173) |
|---|---|---|
| 1 | ORGANIZATION A | 1 |
| 2 | ORGANIZATION B | 2 |
| 3 | ORGANIZATION C | 3 |

FIG. 19

SUB-DATASET
VERIFICATION RESULT 251

| SUB-DATASET ID | VERIFICATION IMPLEMENTATION LEVEL (NUMBER OF VERIFIED NODES) | UPDATE DATE AND TIME |
|---|---|---|
| 11 | N/A | 2019/3/09 03:33:33 |
| 12 | N/A | 2019/3/10 00:00:09 |
| 21 | 0 | 2019/3/11 00:00:10 |
| 22 | 2 (CONTAINER DEPLOYMENT: ORGANIZATION C, DATA INPUT: ORGANIZATION A) | 2019/3/12 0:00:10 |

FIG. 20

ORGANIZATION-RETAINED
POINT INFORMATION 252

| ORGANIZATION ID | ORGANIZATION NAME | REMAINING POINTS | UPDATE DATE AND TIME |
|---|---|---|---|
| 1 | ORGANIZATION A | 100 | 2019/3/11 01:11:11 |
| 2 | ORGANIZATION B | 210 | 2019/3/11 01:11:12 |
| 3 | ORGANIZATION C | 400 | 2019/3/11 02:00:01 |

FIG. 21

CONTAINER LOG 253

| CONTAINER LOG ID | LOG INFORMATION |
|---|---|
| 1 | 2019/3/10 1:24:00, DATA 21 (VALUES:["val":100, "result": "OK"]) IS CREATED FROM DATA 11 (VALUES:100,300,0) (SUB-DATASET 11) AND STORED IN SUB-DATASET 21 |

FIG. 22

BLOCKCHAIN 227

| BLOCK ID (2271) | TIME STAMP (2272) | SC ID (2273) | CALLED FUNCTION (2274) | TX ISSUER (2275) | TX APPROVER (2276) | RW SET (2277) | | | | PRECEDING BLOCK HASH VALUE (2278) |
|---|---|---|---|---|---|---|---|---|---|---|
| | | | | | | R OR W | Key | Value | VERSION | |
| 1 | 2019/3/11 00:00:10 | 3 | VERIFY (VERIFY OUTPUT DATA) | ORGANIZATION B | ORGANIZATION B | W | VERIFICATION IMPLEMENTATION LEVEL (SUB-DATASET 21) | 0 | 4 | Xxx |
| 2 | 2019/3/12 00:00:10 | 1 | DEPLOY | ORGANIZATION B | ORGANIZATION A, C | R OR W | Key | Value | VERSION | Xxxa |
| | | | | | | W | POINTS OF ORGANIZATION A | 100 | 2 | |
| | | | | | | W | POINTS OF ORGANIZATION C | 400 | 2 | |
| 3 | 2019/3/12 00:01:00 | 2 | INPUT DATA | ORGANIZATION B | ORGANIZATION A, C | N/A | | | | Xxxb |
| 4 | 2019/3/12 00:01:00 | 3 | VERIFY | ORGANIZATION B | ORGANIZATION A, C | R OR W | Key | Value | VERSION | Xxxc |
| | | | | | | W | VERIFICATION IMPLEMENTATION LEVEL (SUB-DATASET 22) | 2 | 3 | |

FIG. 23A

BLOCKCHAIN 227

| BLOCK ID (2271) | TIME STAMP (2272) | SC ID (2273) | CALLED FUNCTION (2274) | TX ISSUER (2275) | TX APPROVER (2276) | RW SET (2277) | | | | PRECEDING BLOCK HASH VALUE (2278) |
|---|---|---|---|---|---|---|---|---|---|---|
| | | | | | | R OR W | Key | Value | VERSION | |
| 5 | 2019/3/10 01:30:00 | 4 | ACCUMULATE LOG | ORGANIZATION B | ORGANIZATION A, C | W | CONTAINER LOG 1 | 2019/3/10 1:24:00, DATA 21 (VALUES: ["val":100, "result":"OK"]) IS CREATED FROM DATA 11 (VALUES:100,300,0) (SUB-DATASET 11) AND STORED IN SUB-DATASET 21 | 1 | Xxx |

The columns under "TRANSACTION INFORMATION" span 2274–2277.

FIG. 23B

SMART CONTRACT INFORMATION 228

| SMART CONTRACT ID | TYPE | FUNCTION |
| --- | --- | --- |
| 1 | VERIFY (DEPLOY CONTAINER, UPDATE POINTS) | ·DEPLOY |
| 2 | VERIFY (INPUT DATA) | ·INPUT DATA |
| 3 | VERIFY (VERIFY OUTPUT DATA) | ·VERIFY |
| 4 | ACCUMULATE CONTAINER LOG | ·ACCUMULATE LOG |

OUTPUT DATA 229

| CONTAINER ID | INPUT SUB-DATASET ID | OUTPUT DATA |
| --- | --- | --- |
| 101 | 12 | {"val":110,"result":"OK"} {"val":120,"result":"OK"} |
| 201 | 22 | {"period":"3/11","result":"All OK"} |

CONTAINER IMAGE 651

| CONTAINER ID | CONTENT |
| --- | --- |
| 1 | 2FDCE3E13116503B5DE0697····· |
| 2 | 9407ECBC1F7EDF0B4634D5····· |
| : | : |

INFORMATION PROCESSING SYSTEM AND METHOD OF CONTROLLING INFORMATION PROCESSING SYSTEM

CROSS-REFERENCE TO RELATED APPLICATION

This application claims priority pursuant to Japanese patent application No. 2019-103187, filed on May 31, 2019, the entire disclosure of which is incorporated herein by reference.

BACKGROUND

Technical Field

The present invention relates to an information processing system and a method of controlling an information processing system.

Related Art

Utilization of Internet-of-things (IoT) data collected from sensors and the like has been accelerating in recent years. In the industrial field in particular, utilization of such IoT data collected from plant facilities, sensors, and the like is in progress across organizations and enterprises.

Regarding the IoT data collected from the plant facilities, the sensors, and the like in general, it is rare to use the raw data collected from the facilities, the sensors, and the like without change. Instead, the data usually undergo processing according to the intended purpose before the usage. In the meantime, when data processed in a first organization are used in a second organization, the data undergo additional processing conducted by the second organization.

Due to the occurrence of data falsification at manufacturing sites in these days, there has been a demand for assurance that the data are not falsified. Concerning this demand, US Patent Application Publication No. 2017-0295232 (PTL 1) discloses a concept of storing and sharing events of changing (processing) electronic files in a blockchain, thereby sharing processing statuses in real time and ensuring reliability of change histories.

Meanwhile, the technique disclosed in PTL 1 is designed to allow an organization that processes the data to register a processing history with the blockchain. Accordingly, this organization can falsify the processing history before the registration with the blockchain and this technique cannot always assure reliability of the processing history.

On the other hand, in a case where organizations in a consortium are assigned to mutually verify processing histories performed by other parties based on the concept of the consortium blockchain, this structure poses a problem of requiring large computing resources consumed for the verification. If this structure is simply designed to implement the mutual verification in the consortium, then all the organizations will be required to perform the same amount of processing and to verify the same amount of the processing result, thus necessitating considerable computing resources in order to process enormous IoT data. Meanwhile, there is a limitation in amount of processing executable with a smart contract of the blockchain. Moreover, it is not always realistic to re-implement the processing already performed by using various existing processing tools anew as the smart contracts.

SUMMARY

The present invention has been made in view of the aforementioned background. An object of the present invention is to provide an information processing system and a method of controlling an information processing system, which are capable of improving reliability of data while efficiently achieving a structure for verifying contents of data processing handled by two or more organizations.

An aspect of the present invention to achieve the above objective is an information processing system comprising:
a plurality of distributed ledger nodes provided to a plurality of organizations, respectively, and configured to verify a content of a transaction with each other and to hold a history of the transaction in distributed ledgers provided to the organizations, respectively;
a client node configured to transmit the transaction to the distributed ledger nodes; and
a plurality of processing nodes provided to the plurality of organizations, respectively, and configured to execute verification target processing targeted for verification on a virtual platform, wherein
the client node selects the distributed ledger nodes to perform the verification of the verification target processing and transmits the transaction including a request to execute the verification target processing to each of the selected distributed ledger nodes, and
when each selected distributed ledger node receives the transaction, the distributed ledger node causes the processing node in the organization, to which the distributed ledger node belongs, to perform the verification of the verification target processing by executing the verification target processing on the virtual platform, and records a result of the verification in the distributed ledger.

Other objects of this disclosure and solutions therefor will become more apparent from the following paragraphs in the detailed description of the invention as well as from the accompanying drawings.

According to the present invention, it is possible to improve reliability of data while efficiently achieving a structure for verifying contents of data processing handled by two or more organizations.

BRIEF DESCRIPTION OF THE DRAWINGS

FIG. 11 shows an example of data flow information.
FIG. 12 shows an example of a deployment log.
FIG. 13 shows an example of container information.
FIG. 14 shows an example of a container log.

FIG. 15 shows an example of a dataset.

FIG. 17 shows an example of verifying party determination processing node information.

FIG. 18 shows an example of verifying party determination parameter information.

FIG. 19 shows an example of organization information.

FIG. 20 shows an example of a sub-dataset verification result.

FIG. 21 shows an example of organization-retained point information.

FIG. 22 shows an example of a container log.

FIG. 23A shows an example of a blockchain.

FIG. 23B shows the example of the blockchain (continued from FIG. 23A).

FIG. 24 shows an example of smart contract information.

FIG. 25 shows an example of output data.

FIG. 26 shows an example of a container image.

DETAILED DESCRIPTION OF THE EMBODIMENTS

Figure 1:
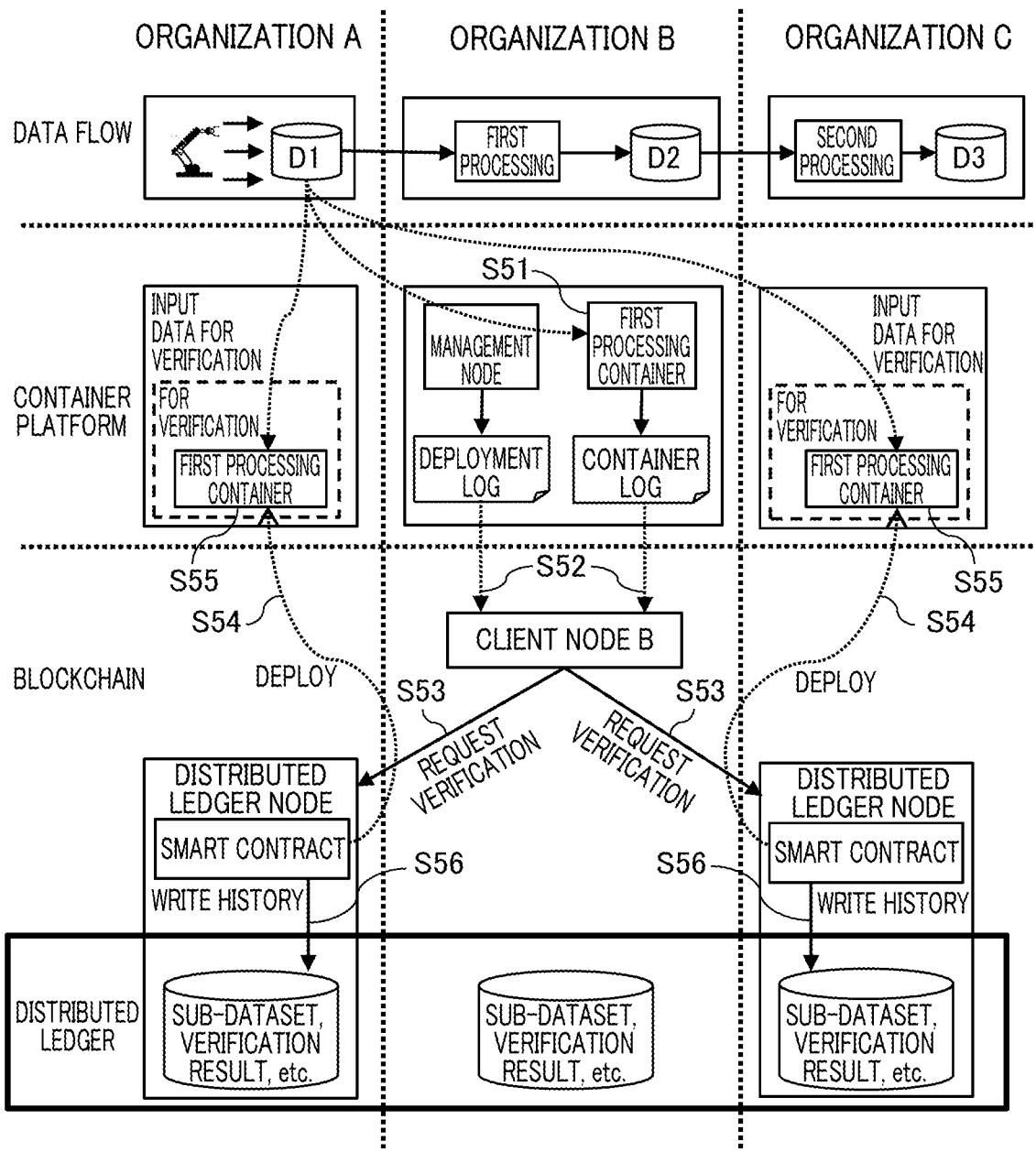
FIG. 1 is a diagram to explain a structure of a data processing history management system.

Now, an embodiment of the present invention will be described below with reference to the accompanying drawings. In the following description, the same or similar constituents may be denoted by the same reference numerals and overlapping explanations thereof may be omitted as appropriate. Meanwhile, if it is necessary to distinguish configurations of the same type from each other in the following description, then reference numerals that generally represent such configurations may be followed by parenthesized identifiers (such as numerals and alphabets) as appropriate. In the meantime, a "blockchain" may be abbreviated as "BC" in the following description as appropriate.

FIG. 1 is a diagram to explain a structure of a data processing history management system 1, which is an information processing system demonstrated as an embodiment. When data are provided and processed among two or more organizations in accordance with a data flow, the data processing history management system 1 verifies the data used in the respective organizations by employing a consortium blockchain structure, thereby preventing the data used in the data flow from being subjected to fraud or falsification.

FIG. 1 illustrates an example of providing and processing the data in accordance with the data flow among three organizations (hereinafter referred to as an "organization A", an "organization B", and an "organization C") that utilize the data. Of stages in FIG. 1 partitioned by using dotted lines, an upper stage illustrates the data flow, a middle stage illustrates a container platform which is a virtual platform that executes the data flow, and a lower stage illustrates a blockchain that manages processing histories of the data, respectively.

As shown in the upper stage, in the exemplary data flow, data D1 acquired by the organization A from a data source 50 is provide to the organization B. The organization B performs first processing on the data D1 to create data D2. The created data D2 is provided to the organization C. The organization C performs second processing on the data D2 to create data D3.

As shown in the middle stage, the first processing is executed by a container (hereinafter referred to as a "first processing container") deployed to a container platform of the organization B, while the second processing is executed by a container (hereinafter referred to as a "second processing container") deployed to a container platform of the organization C (S51).

Here, in terms of the first processing to be executed by the organization B, when the first processing container processes the data D1, the first processing container transmits a deployment log of the first processing container and a container log created by execution of the first processing container to a client node B of the organization B (S52).

When the client node of the organization B receives the deployment log and the container log from the first processing container, the client node transmits a verification request to respective distributed ledger nodes of other organizations, namely, the organization A and the organization C (S53).

Upon receipt of the verification request, each of the distributed ledger nodes of the organization A and the organization C deploys the first processing container for verification to the container platform of each organization, to which the distributed ledger node belongs, by means of each smart contract (S54). Then, each distributed ledger node inputs the data D1 to each deployed first processing container, and verifies a content of processing of the data D1 based on a result of processing (replicated processing) carried out on the data D1 by each first processing container (S55).

When the verification is successful, the respective distributed ledger nodes of the organization A and the organization C write the verification result in sub-dataset verification results in distributed ledgers of the respective organizations (S56).

Figure 2:
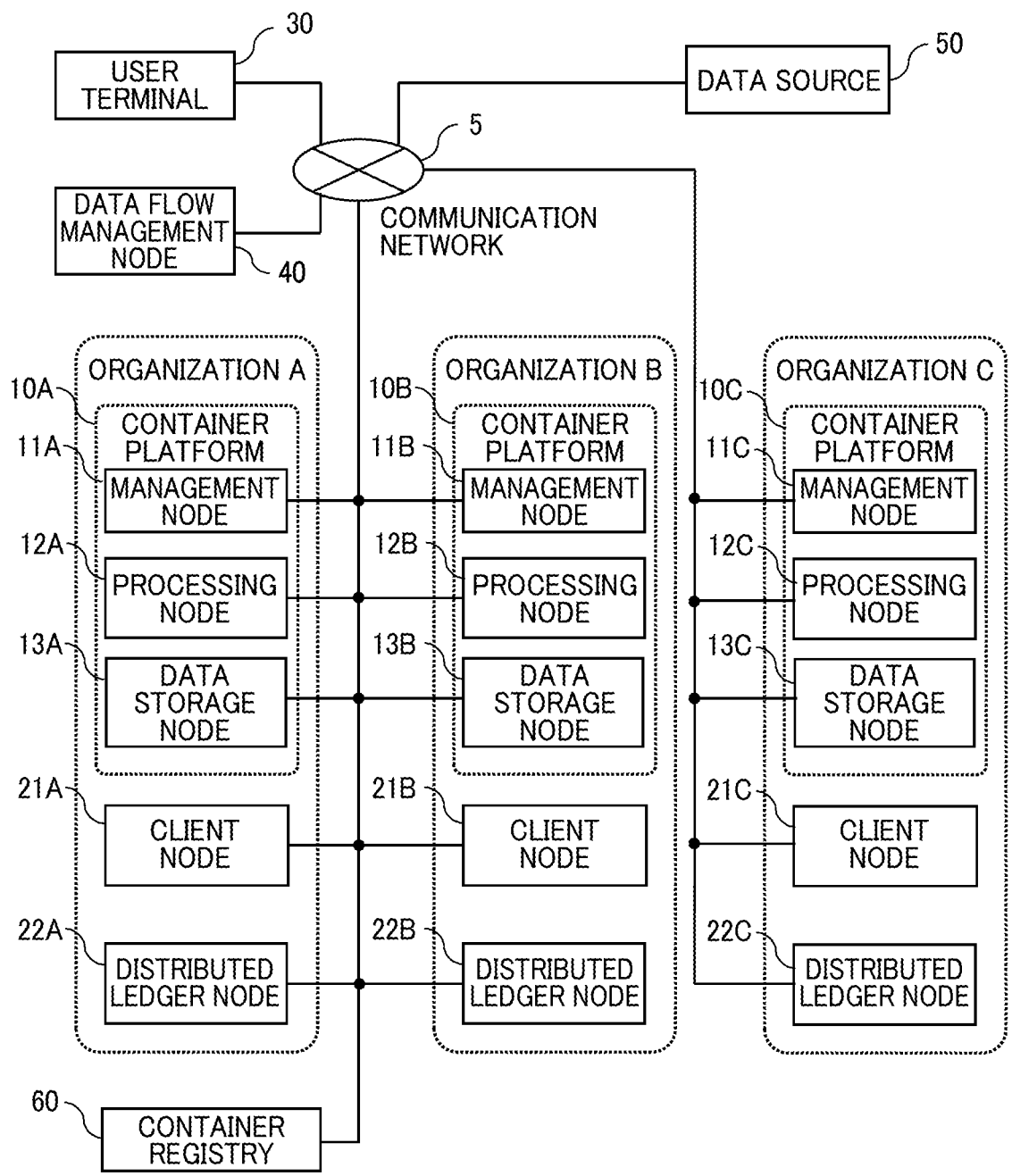
FIG. 2 is a block diagram to explain a schematic configuration of the data processing history management system.

FIG. 2 is a block diagram to explain a schematic configuration of the data processing history management system 1. As shown in FIG. 2, the data processing history management system 1 includes a user terminal 30, a data flow management node 40, the data source 50, a container registry 60, and node groups (management nodes 11, processing nodes 12, data storage nodes 13, client nodes 21, and distributed ledger nodes 22) that are present in the respective organizations. These constituents are constructed by using information processing apparatuses (computers). In addition, the constituents are coupled to one another communicably through a communication network 5. Here, the communication network 5 may be constructed by using two or more networks. For example, the communication network to couple container platforms 10 to the data source 50 may be different from the communication network to couple the client nodes 21 to the distributed ledger nodes 22.

Each container platform 10 realizes the management node 11, the processing node 12, and the data storage node 13. For example, the container platform 10 is constructed by using Docker (registered trademark), Kubernetes (registered trademark), or the like. Note that the container platform is merely an example of anode realization platform (a processing execution environment), and a platform configured to execute a virtual machine and the like may be used as the node realization platform instead of the container platform 10. In the latter case, the container registry 60 serves as an image registry for the virtual machine.

When the container platform 10 is constructed by using Kubernetes (registered trademark), it is possible to fix the content of the processing as a container image. Meanwhile, when a hash value of the container image is managed with the distributed ledgers of the blockchain, it is possible to verify whether or not the content of the processing is falsified. In the meantime, since Kubernetes (registered trademark) has excellent portability, it is possible to construct the processing execution environments in the respective organizations easily when deploying containers for verification (hereinafter referred to as "verification containers") to the container platforms 10 of the respective organizations.

The user terminal 30 provides a user interface for allowing a user to manage the data flow. The user terminal 30 accepts a request concerning the data flow from the user and transmits the request to the data flow management node 40. The data flow management node 40 requests the management node 11 to perform management (new flow creation, modification (editing), deletion, and the like) of the data flow requested from the user terminal 30. Here, the data flow management node 40 may be integrated with (constructed by using the same information processing apparatus as) the user terminal 30.

The data source 50 is a creation source (such as various manufacturing apparatuses, various machines, and various sensors) of the data handled by the organizations, which creates sensor data (IoT data).

The container registry 60 manages container images. Upon receipt of an acquisition request for a container image from any of the processing nodes 12, the container registry 60 provides (delivers) the container image to the source of the request.

Each management node 11 performs processing concerning the management of the corresponding container platform 10. This processing includes processing concerning deployment of the container to the processing node 12, processing concerning creation of the deployment log, and so forth.

Each processing node 12 executes the container and performs processing concerning input and output of the data to and from the container. Moreover, the processing node 12 performs processing concerning creation and management of a container execution log. Note that two or more processing nodes 12 may be present in the same organization.

Each data storage node 13 manages (stores) the data collected from the data source 50 and the data processed by the processing container. The data storage node 13 provides information concerning the data stored therein to another node.

Each client node 21 performs a variety of processing concerning the blockchain. The client node 21 selects the distributed ledger node 22 of the verifying party.

Each distributed ledger node 22 manages the distributed ledger of the blockchain and performs processing concerning the verification of the content of the processing of the data. Two or more distributed ledger nodes 22 may be present in the same organization.

Figure 3:
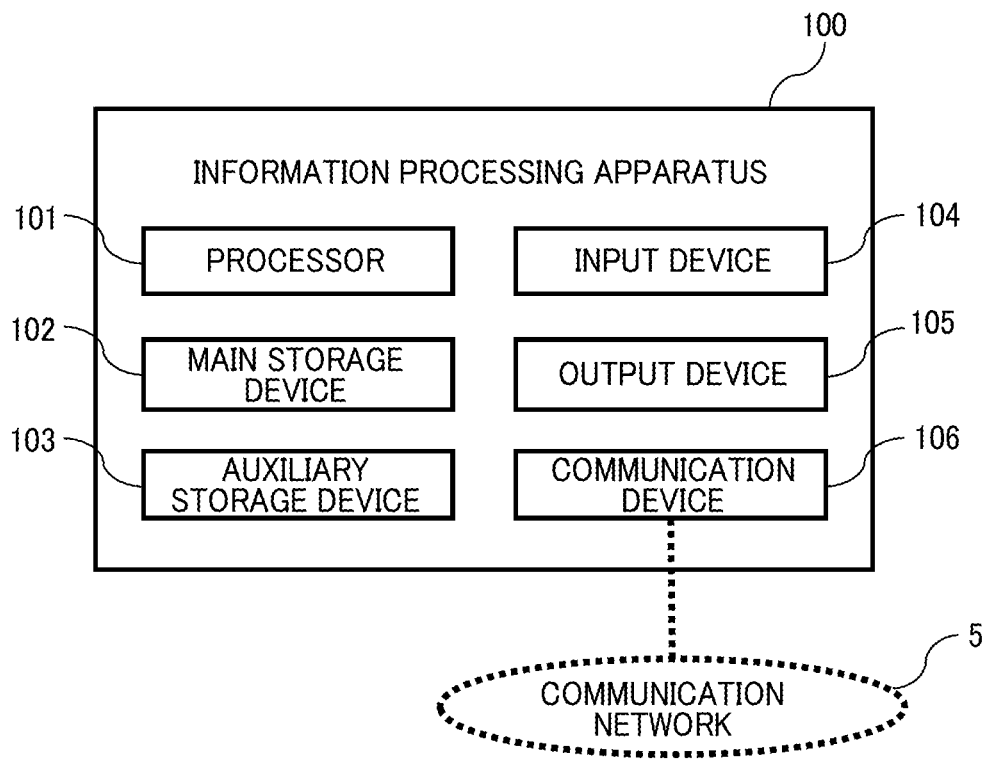
FIG. 3 is a block diagram showing an example of an information processing apparatus constructing the data processing history management system.

FIG. 3 is a block diagram showing an example of an information processing apparatus (hereinafter referred to as an "information processing apparatus 100") that constructs the user terminal 30, the data flow management node 40, the container registry 60, and the container platform 10.

As shown in FIG. 3, the information processing apparatus 100 shown as an example includes a processor 101, a main storage device 102, an auxiliary storage device 103, an input device 104, an output device 105, and a communication device 106. Here, the information processing apparatus 100 may be constructed by using virtual information processing resources such as a cloud server in cloud computing.

The processor 101 is a device that performs arithmetic processing, examples of which include a central processing unit (CPU), a micro processing unit (MPU), a graphics processing unit (GPU), an artificial intelligence (AI) chip, and the like. The main storage device 102 is a device to store programs and data, examples of which include a read only memory (ROM), a static random access memory (SRAM), a non-volatile RAM (NVRAM), a mask read only memory (mask ROM), a programmable ROM (PROM), a random access memory (RAM), a dynamic random access memory (DRAM), and the like. The auxiliary storage device 103 is any one of a hard disk drive, a flash memory, a solid state drive (SSD), an optical storage device (such as a compact disc (CD) and a digital versatile disc (DVD)), and the like. The programs and the data stored in the auxiliary storage device 103 are read into the main storage device 102 as needed.

The input device 104 is a user interface which accepts information from the user, examples of which include a keyboard, a mouse, a card reader, a touch panel, and the like. The output device 105 is a user interface which outputs a variety of information (in the form of display output, voice output, print output, and so forth), examples of which include a display device (such as a liquid crystal display (LCD) and a graphic card) that visualizes the variety of information, a voice output device (such as a speaker), a printing device, and the like.

The communication device 106 is a communication interface that communicates with another device through the communication network 5, examples of which include a network interface card (NIC), a radio communication module, a universal serial bus (USB) module, a serial communication module, and the like. The communication device 106 can also function as an input device to receive information from another device that is communicably coupled thereto. Alternatively, the communication device 106 can also function as an output device to transmit information to another device communicably coupled thereto.

The functions provided to the respective nodes (the management node 11, the processing node 12, the data storage node 13, the client node 21, and the distributed ledger node 22) realized by the user terminal 30, the data flow management node 40, the container registry 60, and the container platform 10 are implemented by causing the processor 101 to read and execute the programs stored in the main storage device 102, or by means of hardware (such as an FPGA, an ASIC, and an AI chip) constructing the information processing apparatus 100. The information processing apparatus 100 may also have functions as an operating system, a device driver, a file system, a database management system (DBMS), and the like as basic functions, for example.

Figure 4:
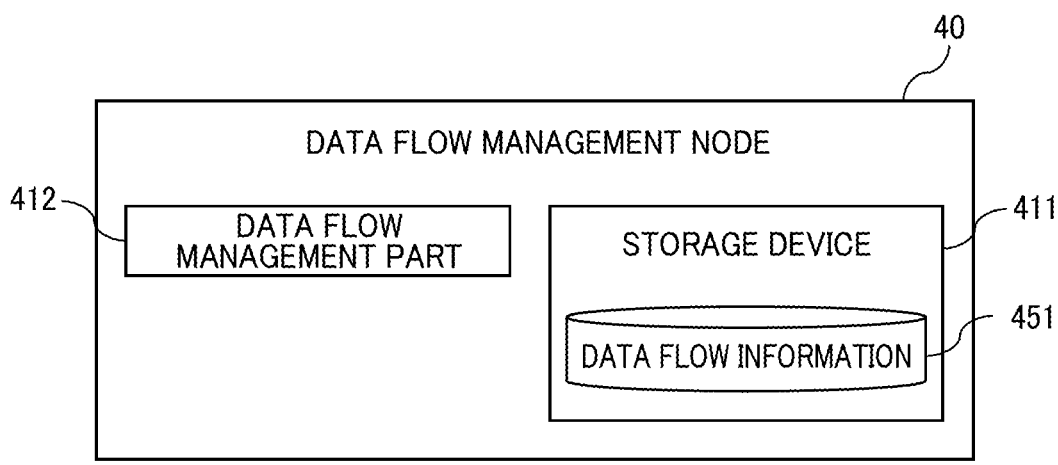
FIG. 4 is a block diagram to explain functions provided to a data flow management node.

FIG. 4 is a block diagram to explain functions provided to the data flow management node 40. The data flow management node 40 has functions as a storage device 411 and a data flow management part 412.

Of the aforementioned functions, the storage device 411 stores data flow information 451. The data flow management part 412 issues a request for processing concerning management and editing (addition, modification, deletion, and the like) of the data flow to the management node 11. The data flow information 451 includes a variety of information concerning the data flow.

Figure 5:
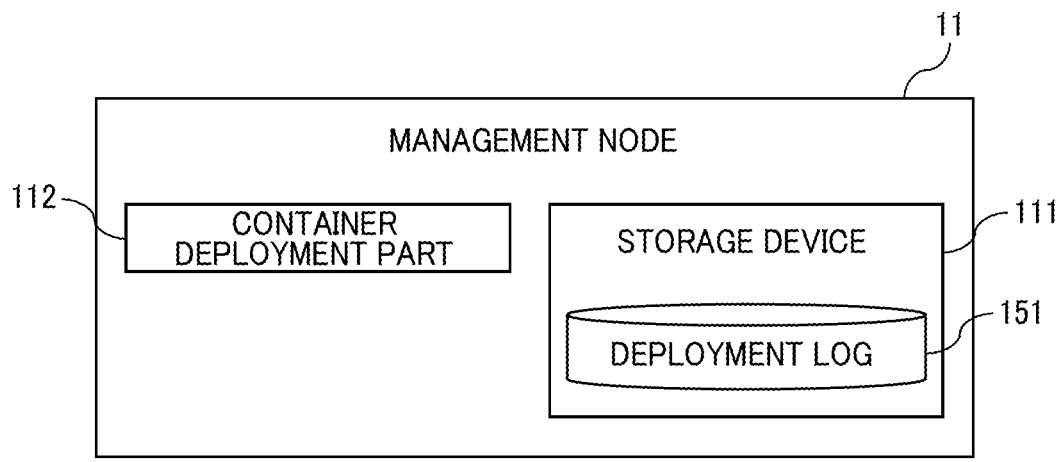
FIG. 5 is a block diagram to explain functions provided to a management node.

FIG. 5 is a block diagram to explain functions provided to the management node 11. The management node 11 includes a storage device 111 and a container deployment part 112. The storage device 111 stores a deployment log 151. The deployment log 151 holds log information concerning the deployment of the container. The container deployment part 112 performs processing concerning the deployment of the container to the processing node 12. Here, the processing node 12 may realize all or part of the functions of the management node 11.

Figure 6:
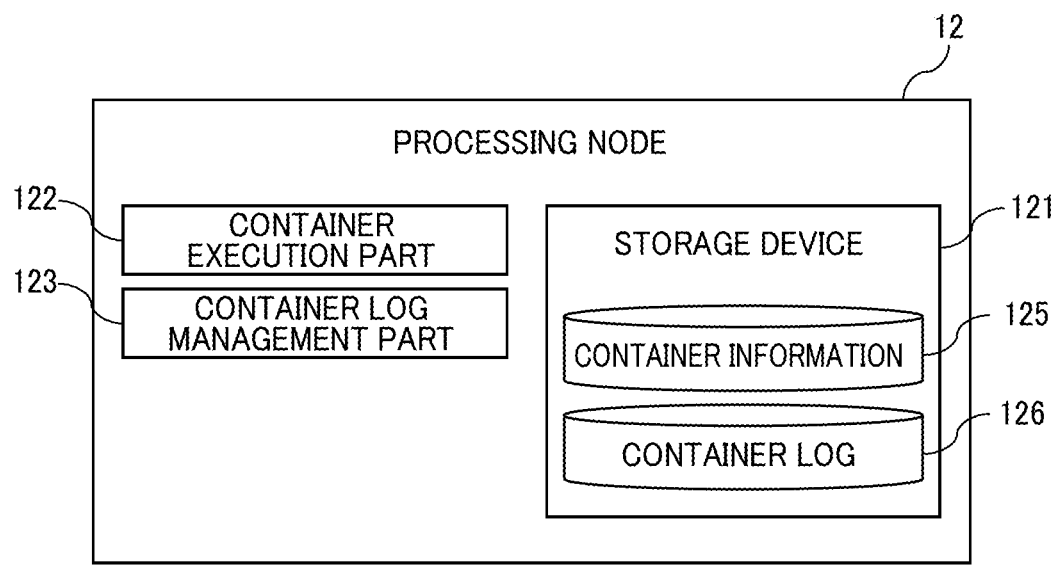
FIG. 6 is a block diagram to explain a configuration of a processing node.

FIG. 6 is a block diagram to explain a configuration of the processing node 12. The processing node 12 includes a storage device 121, a container execution part 122, and a container log management part 123.

The storage device 121 stores container information 125 and a container log 126. The container information 125 includes information concerning the container deployed to the processing node 12. The container log 126 includes a content of standard output from the container and an execution history of the data processing, for example.

The container execution part 122 performs processing concerning execution of the container. Moreover, the container execution part 122 performs processing concerning control of input and output of the data to and from the container.

The container log management part 123 manages (stores) the execution history outputted from the container as the container log 126.

Figure 7:
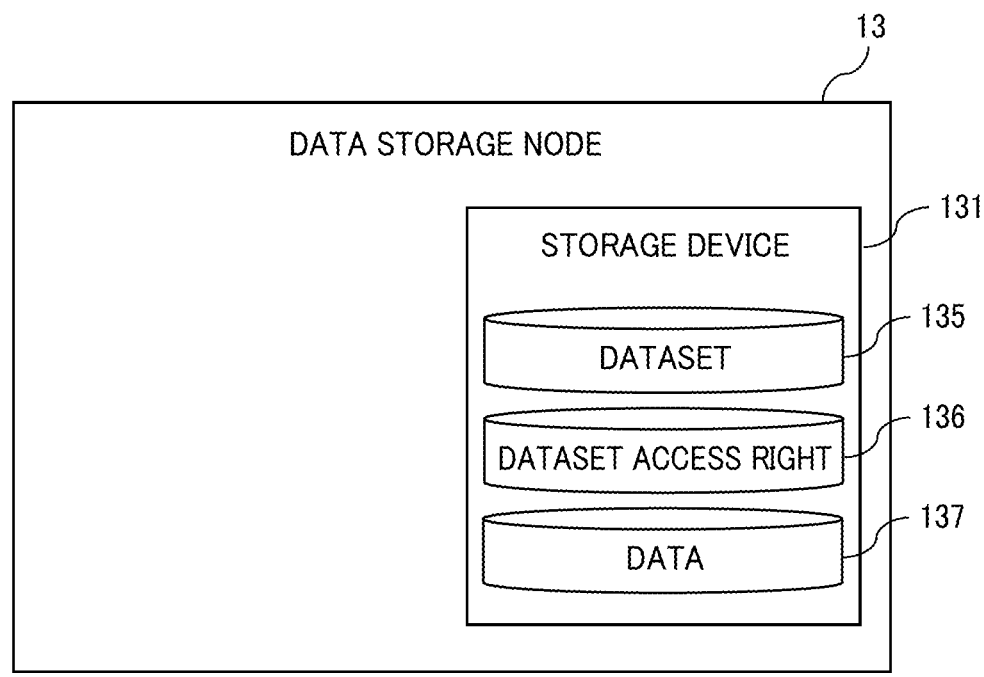
FIG. 7 is a block diagram to explain a configuration of a data storage node.

FIG. 7 is a block diagram to explain a configuration of the data storage node 13. The data storage node 13 includes a storage device 131. The storage device 131 stores a dataset 135, a dataset access right 136, and data 137.

The dataset 135 is formed from the data acquired from the data source 50 and the data processed in the processing. The dataset access right 136 includes information concerning an access right of the organization to the dataset. The data 137 includes the data acquired from the data source 50 and the data processed in the processing. In order to improve data reliability, the original data and the hash value of the data may be recorded in the distributed ledger.

Figure 8:
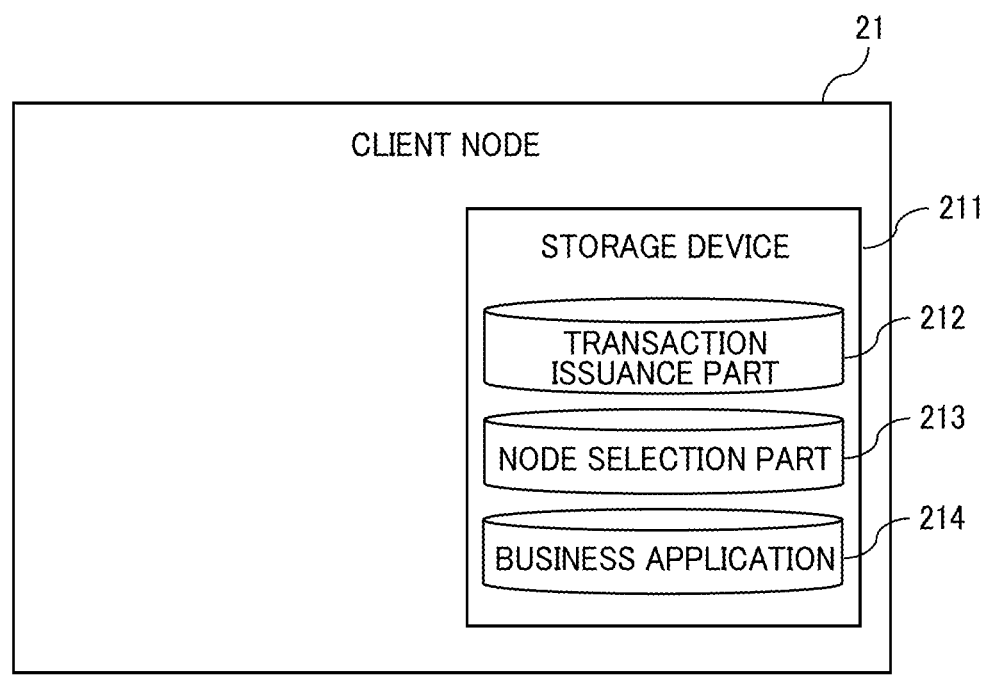
FIG. 8 is a block diagram to explain a configuration of a client node.

FIG. 8 is a block diagram to explain a configuration of the client node 21. The client node 21 includes a storage device 211, a transaction issuance part 212, a node selection part 213, and a business application 214.

The storage device 211 stores verifying party determination processing node information 215, verifying party determination parameter information 216, and organization information 217. The verifying party determination processing node information 215 is information used for determination of a verifying party, which includes information concerning the processing node 12. The verifying party determination parameter information 216 is information used for determination of the verifying party, which includes information concerning various parameters. The organization information 217 includes information indicating a correspondence of the organization to the distributed ledger node 22.

The transaction issuance part 212 issues (transmits) a transaction to the distributed ledger node 22 of the blockchain. As described later, the transaction issuance part 212 issues to the distributed ledger node 22 the transaction that includes the verification request concerning the content of the processing of the data (details of the processing).

The node selection part 213 performs processing concerning selection of the distributed ledger node 22 used for the verification of the processing.

The business application 214 acquires the container log including the information concerning the content of the processing from the processing node 12 or the like, and requests the transaction issuance part 212 to issue the transaction so as to verify the content.

Figure 9:
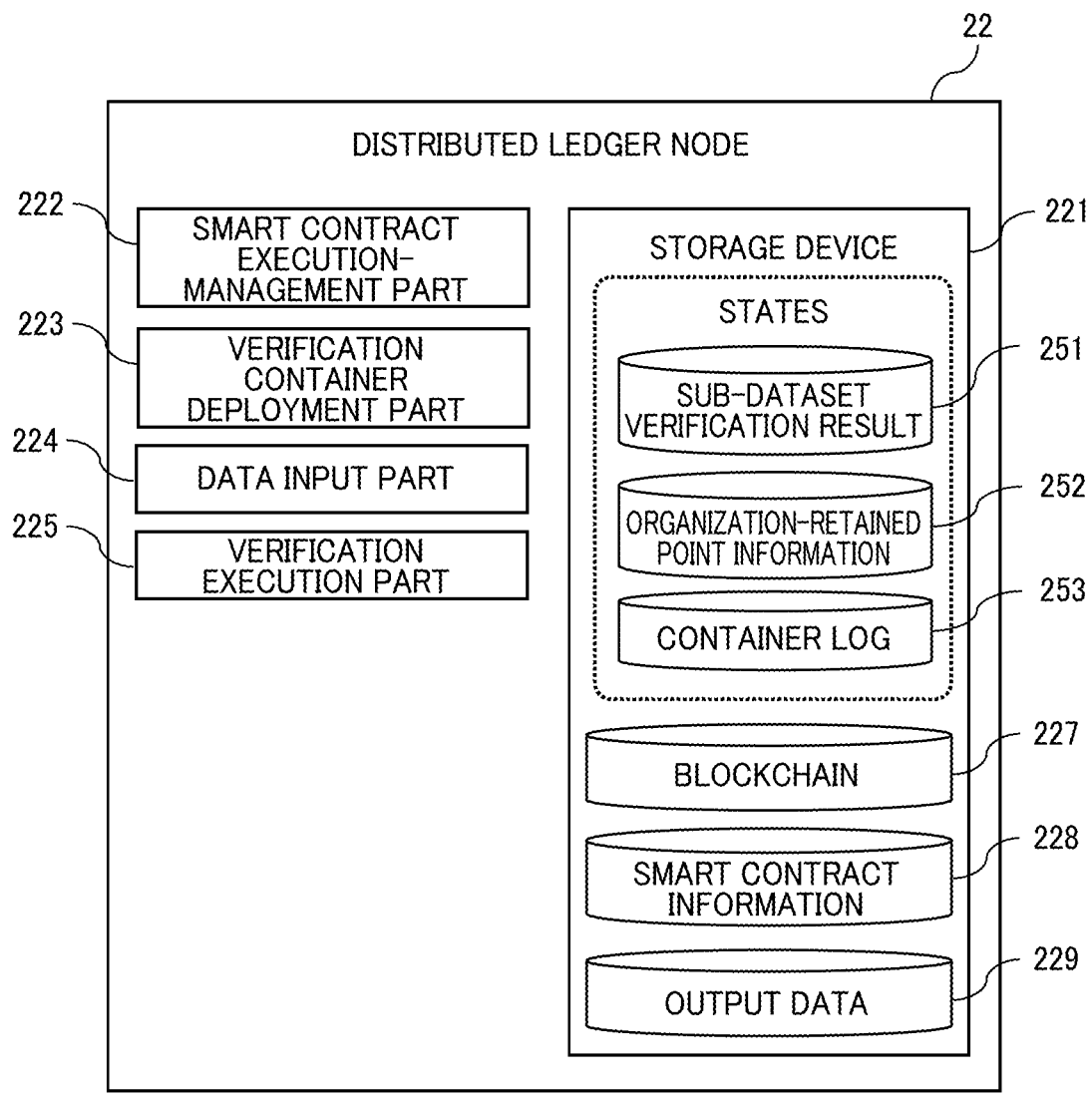
FIG. 9 is a block diagram to explain a configuration of a distributed ledger node.

FIG. 9 is a block diagram to explain a configuration of the distributed ledger node 22. The distributed ledger node 22 includes a storage device 221, a smart contract execution-management part 222, a verification container deployment part 223, a data input part 224, and a verification execution part 225.

The storage device 221 stores current (the newest) states (a sub-dataset verification result 251, organization-retained point information 252, and a container log 253), a blockchain 227, smart contract information 228, and output data 229.

The sub-dataset verification result 251 includes verification results on the processing of respective sub-datasets. Each sub-dataset is a constituent of the dataset, which is obtained by dividing the dataset by a predetermined acquisition period, for instance.

The organization-retained point information 252 holds points retained by the respective organizations. Here, the points represent benefits provided to each organization that provides computing resources (such as resources of the processing node 12) for the verification of the processing of the data. Moreover, the points encourage beneficiary liability. The organization which uses the dataset spends the points required for the usage.

The container log 253 includes the content of standard output from the container and the execution history of the data processing, for example.

The blockchain 227 includes information on an execution history of the transaction.

The smart contract information 228 includes information concerning the smart contract registered in the distributed ledger node 22.

The output data 229 includes processed data obtained after the verification container performs the data processing.

The smart contract execution-management part 222 performs processing (management) concerning execution of the smart contract.

The verification container deployment part 223 is called up by the smart contract, and performs processing concerning deployment of the verification container to the processing node 12, which is designated by the transaction.

The data input part 224 is called up by the smart contract, and acquires unprocessed input data before the processing included in the transaction, and inputs the acquired input data to the verification container.

The verification execution part 225 is called up by the smart contract, and performs processing to verify whether the data processing is correct or incorrect based on the output data of the verification container. The verification execution part 225 performs the above-mentioned verification based on a value included in the container log 126 of the processing node 12 and a value included in the output data. Note that the method of verification is not limited to the foregoing.

Figure 10:
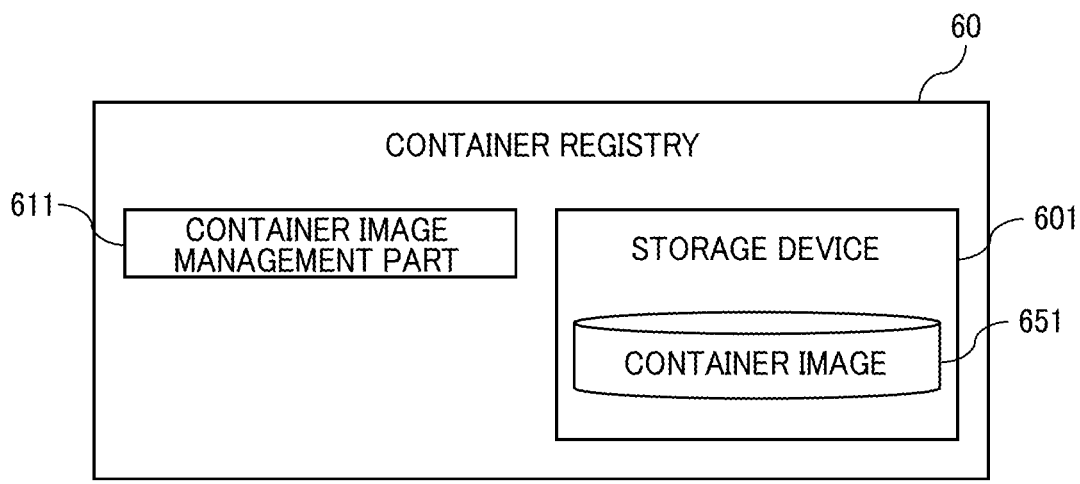
FIG. 10 is a block diagram to explain a configuration of a container registry.

FIG. 10 is a block diagram to explain a configuration of the container registry 60. The container registry 60 includes a storage device 601 and a container image management part 611.

The storage device 601 stores a container image 651. The container image management part 611 performs processing concerning registration and provision (distribution and delivery) of the container image 651.

FIG. 11 shows an example of the data flow information 451 illustrated in FIG. 4. The data flow information 451 is formed from at least one record including items of data flow ID item 4511, a creator organization item 4512, a created date and time item 4513, a deleted date and time item 4514, an inputted dataset ID item 4515, a processing container ID item 4516, an outputted dataset ID item 4517, and a status item 4518. Each record corresponds to one data flow.

Of the above-mentioned items, an identifier for the data flow (hereinafter referred to as a "data flow ID") is set to the data flow ID item 4511. An identifier for the organization which requests creation of the data flow (hereinafter referred to as an "organization ID") is set to the creator organization item 4512. The date and time of creation of the data flow is set to the created date and time item 4513. When the data flow is deleted, the date and time when the deletion takes place is set to the deleted date and time item 4514. If the deletion does not take place, then a value "n/a" is set to the deleted date and time item 4514.

An identifier for the dataset inputted to the data flow (hereinafter referred to as a "dataset ID") is set to the inputted dataset ID item 4515. There is a case where two or more datasets are inputted to the same data flow. In this case, the dataset IDs of the respective datasets are set to the inputted dataset ID item 4515.

An identifier for the container used at the time of execution of the dataflow (hereinafter referred to as a "container ID") is set to the processing container ID item 4516. The dataset ID for the dataset to be created (outputted) by executing the data flow is set to the outputted dataset ID item 4517. Information indicating a current status of execution of the data flow is set to the status item 4518.

FIG. 12 shows an example of the deployment log 151 illustrated in FIG. 5. The deployment log 151 is formed from at least one record including items of a deployment log ID item 1511, a created date and time item 1512, a creator container ID item 1513, and an image ID item 1514. Each record corresponds to one deployment log.

Of the above-mentioned items, an identifier for the deployment log (hereinafter referred to as a "deployment log ID") is set to the deployment log ID item 1511. The date and time of creation of the deployment log is set to the created date and time item 1512.

The container ID of the container which deploys the container corresponding to the deployment log is set to the creator container ID item 1513. An identifier for the container image corresponding to the deployment log (hereinafter referred to as an "image ID") is set to the image ID item 1514.

FIG. 13 shows an example of the container information 125 illustrated in FIG. 6. The container information 125 is formed from at least one record including items of a container ID item 1251, an image ID item 1252, and a status item 1253. Each record corresponds to one container.

Of the above-mentioned items, the container ID is set to the container ID item 1251. The image ID of the container image of this container is set to the image ID item 1252. Information indicating a current status of execution of the container is set to the status item 1253.

FIG. 14 shows an example of the container log 126 illustrated in FIG. 6. The container log 126 is formed from at least one record including items of a container log ID item 1261, a container ID item 1262, and a log information item 1263. Each record corresponds to one container log.

Of the above-mentioned items, an identifier for the container log (hereinafter referred to as a "container log ID") is set to the container log ID item 1261. The container ID of the container that creates (outputs) the container log is set to the container ID item 1262.

The content of the log outputted from the container is set to the log information item 1263. The log information item 1263 shown as an example includes a value of the input data, a value of the output data, information on the sub-dataset of an output destination, and the like.

FIG. 15 shows an example of the dataset 135 illustrated in FIG. 7. The dataset 135 is formed from at least one record including items of a dataset ID item 1351, a sub-dataset ID item 1352, and an acquisition period item 1353. Each record corresponds to one dataset.

Of the above-mentioned items, an identifier for the dataset (hereinafter referred to as a "dataset ID") is set to the dataset ID item 1351. An identifier for the sub-dataset (hereinafter referred to as a "sub-dataset ID") is set to the sub-dataset ID item 1352. An acquisition period of the sub-dataset is set to the acquisition period item 1353.

Figure 16:
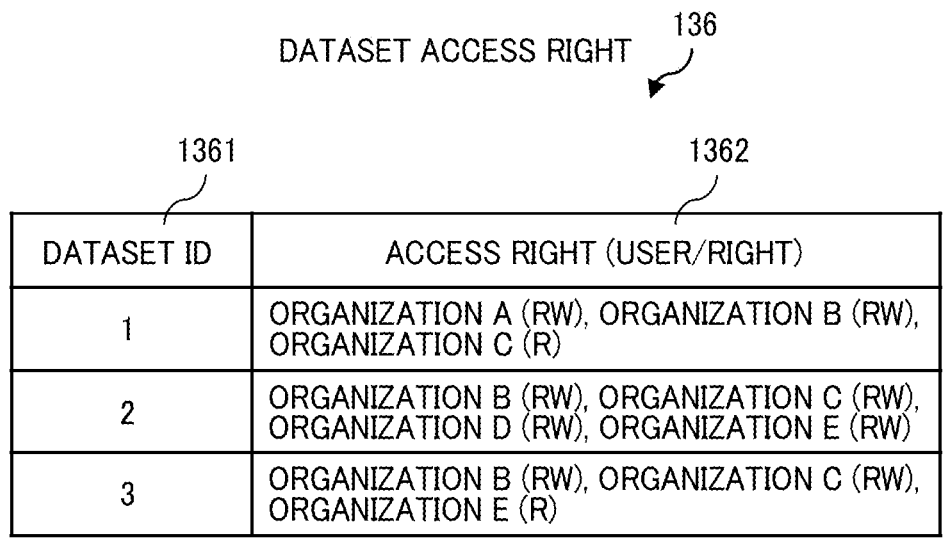
FIG. 16 shows an example of a dataset access right.

FIG. 16 shows an example of the dataset access right 136 illustrated in FIG. 7. The dataset access right 136 is formed from at least one record including items of a dataset ID item 1361 and an access right item 1362. Each record corresponds to one dataset.

Of the above-mentioned items, the dataset ID for the dataset is set to the dataset ID item 1361. A content of an access right of the user (which is one of the organizations in this example) having the access right to the dataset is set to the access right item 1362. Note that a sign "R" in FIG. 16 represents a reading right and a sign "W" therein represents a writing right.

FIG. 17 shows an example of the verifying party determination processing node information 215 illustrated in FIG. 8. The verifying party determination processing node information 215 is formed from at least one record including items of a processing node information ID item 2151, an organization ID item 2152, an accessible dataset item 2153, a currently used dataset item 2154, and a verification implementation required point item 2155. Each record corresponds to a piece of the verifying party determination processing node information.

The verifying party determination processing node information 215 is information used when the client node 21 selects the distributed ledger node 22 of the verifying party.

Of the above-mentioned items, an identifier for the piece of the verifying party determination processing node information (hereinafter referred to as a "processing node information ID") is set to the processing node information ID item 2151. The organization ID is set to the organization ID item 2152.

The dataset IDs of all the datasets accessible to the organization are set to the accessible dataset item 2153. The data set IDs of all the datasets currently used by the organization are set to the currently used dataset item 2154.

A value of points necessary for the organization to provide the verification container is set to the verification implementation required point item 2155.

FIG. 18 shows an example of the verifying party determination parameter information 216 illustrated in FIG. 8. The verifying party determination parameter information 216 is formed from at least one record including items of a parameter information ID item 2161, a parameter item 2162, and a parameter value item 2163. Each record corresponds to a piece of the verifying party determination parameter information.

Of the above-mentioned items, an identifier for the piece of the verifying party determination parameter information (hereinafter referred to as a "parameter information ID") is set to the parameter information ID item 2161. Information indicating the parameter is set to the parameter item 2162. For example, a "verification node (deployment) maximum number", a "verification node (data input) maximum number" or the like is set thereto. A value of the parameter is set to the parameter value item 2163.

FIG. 19 shows an example of the organization information 217 illustrated in FIG. 8. The organization information 217 is formed from at least one record including items of an organization ID item 2171, an organization name item 2172, and a distributed ledger node ID item 2173. Each record corresponds to one organization.

Of the above-mentioned items, the organization ID is set to the organization ID item 2171. A name of the organization is set to the organization name item 2172. An identifier for the distributed ledger node 22 of the organization (hereinafter referred to as a "distributed ledger node ID") is set to the distributed ledger node ID item 2173. There may also be a case where one organization has two or more distributed ledger nodes 22. In that case, the two or more distributed ledger nodes 22 are set to the distributed ledger node ID item 2173.

FIG. 20 shows an example of the sub-dataset verification result 251 illustrated in FIG. 9. The sub-dataset verification result 251 is formed from at least one record including items of a sub-dataset ID item 2511, a verification implementation level item 2512, and an update date and time item 2513. Each record corresponds to one sub-dataset.

Of the above-mentioned items, the sub-dataset ID is set to the sub-dataset ID item 2511. A verification implementation level being an evaluation index representing the quality (reliability) of the verification is set to the verification implementation level item 2512. In this example, the quality of the verification is higher as the value of the verification implementation level is larger. It is possible to learn the quality of the implemented verification from the verification implementation level written in the distributed ledger. When the unprocessed data from the data source 50 is stored in the dataset, the value "n/a" is set to the verification implementation level item 2512. The date and time when the content of the verification implementation level item 2512 is updated is set to the update date and time item 2513.

FIG. 21 shows an example of the organization-retained point information 252 illustrated in FIG. 9. The organization-retained point information 252 is formed from at least one record including items of an organization ID item 2521, an organization name item 2522, a remaining point item 2523, and an update date and time item 2524. Each record corresponds to one organization.

Of the above-mentioned items, the organization ID is set to the organization ID item 2521. The name of the organization is set to the organization name item 2522. A value of points currently retained by each organization is set to the remaining point item 2523. The most recent update date and time (the last update date and time) of the remaining point item 2523 is set to the update date and time item 2524.

FIG. 22 shows an example of the container log 253 illustrated in FIG. 9. The container log 253 is formed from at least one record including items of a container log ID item 2531 and a log information item 2532. Each record corresponds to one container log.

Of the above-mentioned items, the container log ID is set to the container log ID item 2531. The content of the log outputted from the container is set to the log information item 2532. The log information item 2532 shown as an example includes the value of the input data, the value of the output data, information on the sub-dataset of the output destination, and the like.

FIGS. 23A and 23B show an example of the blockchain 227 illustrated in FIG. 9. The blockchain 227 is formed from two or more records each including items of a block ID item 2271, transaction information items (a time stamp item 2272, an SCID item 2273, a called function item 2274, a TX issuer item 2275, a TX approver item 2276, and an RW set item 2277), and a preceding block hash value item 2278. Each record corresponds to one block. In the blockchain 227 shown as an example, one transaction (TX) is stored in one block. However, two or more transactions (TX) may be stored in one block instead.

An identifier for the block constructing the block chain (hereinafter referred to as a "block ID") is set to the block ID item 2271. Of the transaction information items, the date and time (a time stamp) of execution of the TX is set to the time stamp item 2272.

An identifier for the executed smart contract (SC) (hereinafter referred to as a "smart contract ID") is set to the SCID item 2273. A function (which is a function item 2283 in FIG. 24 to be described later) in the called SC is set to the called function item 2274. The name of the organization which issues the transaction (TX) is set to the TX issuer item 2275. The name of the organization which approves the transaction (TX) is set to the TX approver item 2276.

A content of reading and/or writing in response to a read/write set (the states (the sub-dataset verification result 251 in FIG. 20, the organization-retained point information 252 in FIG. 21, and the container log 253 in FIG. 22)) is set to the RW set item 2277. In this example, the RW set item 2277 of a record having a value "1" in the block ID item 2271 represents a case where the unprocessed data from the data source 50 is stored in the dataset, and a value "0" is written in the "verification implementation level" that represents a key. On the other hand, the RW set item 2277 of a record having a value "2" in the block ID item 2271 is involved in the transaction (TX) to deploy the verification container and points are provided as a consequence of the deployment. Accordingly, values "100" and "400" are written in "points for the organization A" and "points for the organization B", respectively, each of which represents the key. In the meantime, the RW set item 2277 of a record having a value "5" in the block ID item 2271 is involved in the container log, and the content of the log information item 2532 with the container log ID having the value of "1" in the container log 253 is set as the value to the "container log 1" that represents the key. Note that the verification result such as a value of the data outputted from the verification container may be included in the RW set in addition to the information on the states.

A hash value of the preceding block is stored zin the preceding block hash value item 2278. The storage of the hash value of the preceding block secures robustness against falsification of the data in the blockchain.

FIG. 24 shows an example of the smart contract information 228 illustrated in FIG. 9. The smart contract information 228 is formed from at least one record including items of a smart contract ID item 2281, a type item 2282, and the function item 2283. Each record corresponds to one smart contract.

The smart contract ID is set to the smart contract ID item 2281. Information indicating the type (the content of the processing) of the smart contract is set to the type item 2282. Examples of the types to be set include "verification (verification container deployment, point update)", "verification (data input)", "verification (output data verification", and the like. A function of each smart contract is set to the function item 2283.

FIG. 25 shows an example of the output data 229 illustrated in FIG. 9. The output data 229 is formed from at least one record including items of a container ID item 2291, an input sub-dataset ID item 2292, and an output data item 2293. Each record corresponds to a piece of the output data. The output data 229 includes information to be used by the distributed ledger node 22 for verifying the content of the processing of the data.

Of the above-mentioned items, an identifier for the piece of the output data (which is the container ID in this example) is set to the container ID item 2291. The sub-dataset ID of the sub-dataset that includes the data to be inputted to the container is set to the input sub-dataset ID item 2292. The content of the outputted data is set to the output data item 2293.

FIG. 26 shows an example of the container image 651 illustrated in FIG. 10. The container image 651 is formed from at least one record including items of a container ID item 6511 and a content item 6512. Each record corresponds to one container.

Of the above-mentioned items, the image ID is set to the container ID item 6511. The content (a substance) of the container image is set to the content item 6512.

<Description of Processing>

Figure 27:
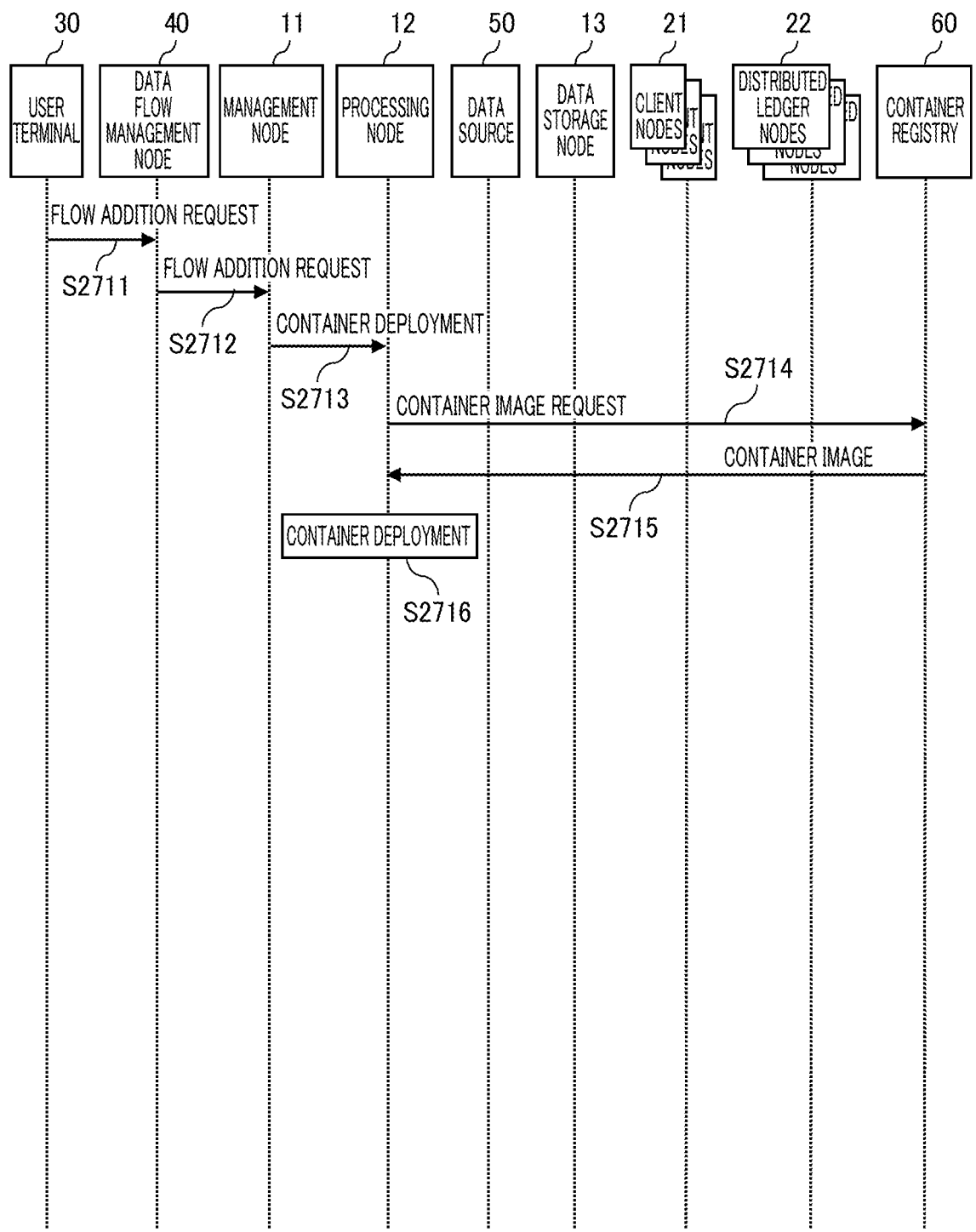
FIG. 27 is a sequence diagram to explain processing to be carried out by the data processing history management system when a user adds a data flow.

FIG. 27 is a sequence diagram to explain processing to be carried out by the data processing history management system 1 when a user adds a data flow.

First, the user terminal 30 transmits a data flow addition request to the data flow management node 40 (S2711). Upon receipt of the addition request, the data flow management node 40 transmits the data flow addition request to the management node 11 of the organization which is the destination of addition of the data flow (S2712).

Upon receipt of the addition request, the management node 11 (or the processing node 12) transmits a container deployment request to the processing node 12 of the organization to which the management node 11 belongs (S2713). Upon receipt of the deployment request, the processing node 12 acquires the container image of the added data flow from the container registry 60 (S2714, S2715), and deploys the container to perform the data processing by use of the acquired container image (S2716).

Figure 28:
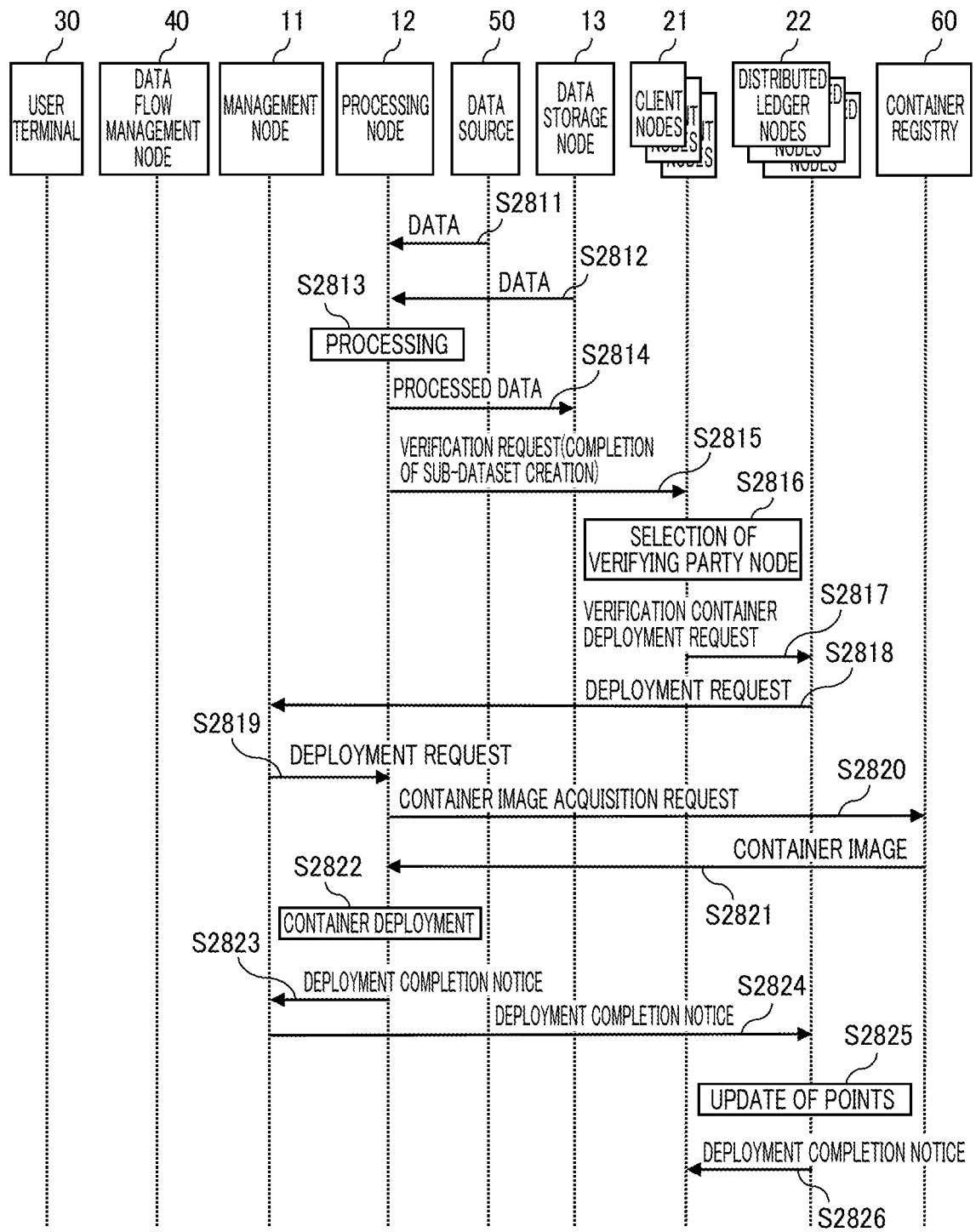
FIG. 28 is a sequence diagram to explain preparation processing concerning verification processing on a content of the processing to be carried out by the data processing history management system when the data processing is performed by a certain organization in accordance with the data flow.

FIG. 28 is a sequence diagram to explain preparation processing concerning verification processing on a content of the processing to be carried out by the data processing history management system 1 when the data processing is performed by a certain organization in accordance with the data flow. The data in the following description is assumed to be time-series data, for example, and the sub-dataset is assumed to be created once in each predetermined period.

First, the data or the dataset as the target of the processing is sent either from the data source 50 or from the data storage node 13 to the processing node 12 (S2811, S2812).

The container of the processing node 12 receives the transmitted data, performs the processing on the received data (S2813), and stores the processed data into the dataset in the data storage node 13 (S2814).

When the creation of the sub-dataset is completed, the container of the processing node 12 requests the client node 21 of the organization, to which the processing node 12 belongs, to verify the content of the processing (S2815). This request includes a notice regarding the completion of creation of the sub-dataset and the container log created in the course of the data processing. In this example, the container of the processing node 12 transmits the request for verification of the content of the processing at the timing of completion of creation of the sub-dataset as described above. However, the timing to transmit the request for verification is not limited to the foregoing. For instance, the request for verification may be transmitted at a timing determined by the user. Alternatively, the request for verification may be transmitted in accordance with the number of pieces of the processed data.

Upon receipt of the request for verification, the client node 21 selects the distributed ledger node 22 of another organization serving as the verifying party (S2816). Note that details of this processing (hereinafter referred to as "verifying party node selection processing S2816") will be described later.

Subsequently, the client node 21 transmits a request for deployment of the verification container to the respective distributed ledger nodes 22 of the other organizations serving as the verifying parties (S2817). This request for deployment includes the image ID of the container image. Here, in order to save the resources, the client node 21 does not transmit the request for deployment in the case where the value "0" is set to the verification implementation level item 2512 of the sub-dataset inputted to the verification container.

Upon receipt of the request for deployment, the distributed ledger node 22 of each of the other organizations sends the management node 11 in its own organization a request to deploy the verification container (S2818).

Upon receipt of the request for deployment, the management node 11 requests the processing node 12 in its own organization to deploy the container designated in the request for deployment (S2819). Here, the management node 11 deploys this container for the verification purpose.

Upon receipt of the request for deployment, the processing node acquires the container image designated in the request for deployment from the container registry 60 (S2820, S2821), then deploys the verification container by using the acquired container image (S2822), and then transmits a notice of completion of deployment to the management node 11 (S2823). Here, the notice of completion includes information (such as a uniform resource locator (URL) and an IP address) to specify whereabouts of the deployed verification container.

Upon receipt of the notice of completion, the management node 11 notifies the distributed ledger node 22 in its own organization of the notice of completion of deployment of the verification container (S2824).

Upon receipt of the notice of completion, the distributed ledger node 22 reflects the points equivalent to the deployment of the verification container to the points of its own organization (updates the remaining point item 2523 in the organization-retained point information 252 shown in FIG. 21) (S2825). Here, an update history of the points is recorded in the blockchain 227 as the RW set item 2277 shown in FIG. 23A as an example.

Subsequently, the distributed ledger node 22 transmits the notice of completion of deployment to the client node 21 which transmits the request for deployment of the verification container in S2817 (S2826).

Figure 29:
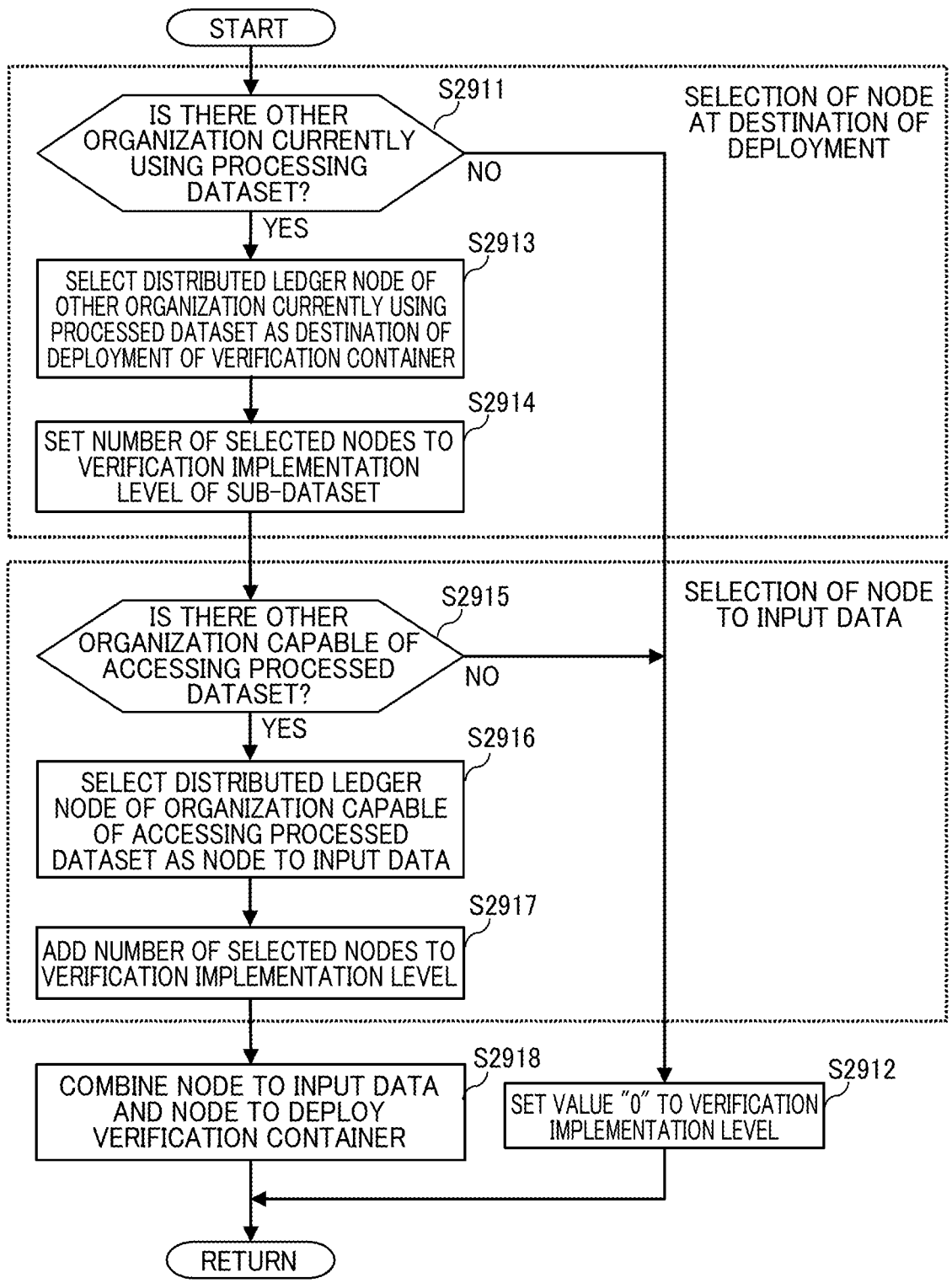
FIG. 29 is a flowchart to explain details of verifying party node selection processing.

FIG. 29 is a flowchart to explain details of the verifying party node selection processing S2816. As shown in FIG. 29, the verifying party node selection processing S2816 includes processing (S2911 to S2914) to select the distributed ledger node 22 at a destination of deployment of the verification container and processing (S2915 to 2917) to select the distributed ledger node 22 which inputs the data to the verification container.

First, the client node 21 refers to the verifying party determination processing node information 215 shown in FIG. 20 and determines whether or not there is an organization among the organizations other than its own organization, which is currently using the processed dataset (S2911). If there is no organization which is currently using the processed dataset (S2911: NO), the client node 21 sets the value "0" to the verification implementation level item 2512 in the sub-dataset verification result 251 shown in FIG. 20 of the processed dataset (the sub-dataset) and then terminates the processing (S2912). When the processed dataset is not used in any other organizations as mentioned above, no distributed ledger node 22 is selected and the verification does not take place. Thus, it is possible to prevent the resources from being wasted.

On the other hand, when there is an organization which is currently using the processed dataset (S2911: YES), the client node selects the distributed ledger node 22 of the organization currently using the processed dataset as a node (a first distributed ledger node) of the destination of deployment of the verification container (S2913). By designating the distributed ledger node 22 of the organization currently using the processed dataset as the destination of deployment of the verification container as described above, it is possible to select the organization which has a significance of bearing a burden caused by the verification. If the number of the distributed ledger nodes 22 selectable as the destination of deployment exceeds the value in the parameter value item 2163 of the parameter item 2162 of the verification node (data input) maximum number in the verifying party determination parameter information 216, the client node 21 selects the maximum number of the distributed ledger nodes 22 while giving priority to the distributed ledger nodes 22 in the organizations which require less points (which are less costly), for example.

Next, the client node 21 sets the number of the selected distributed ledger nodes 22 to the verification implementation level item 2512 in the sub-dataset verification result 251 shown in FIG. 20 of the processed dataset (S2914). Accordingly, as the number of the selected distributed ledger nodes 22 is larger, the verification implement level (the quality of the verification) becomes higher. This is based on the premise that the quality of the verification is improved more as the verification is carried out by more distributed ledger nodes 22.

Subsequently, the client node 21 refers to the dataset access right 136 shown in FIG. 16 and determines whether or not there is an organization other than the organization that carries out the processing, which can access the processed dataset (S2915). If there is no organization that can access the processed dataset (S2915: NO), the client node 21 sets the value "0" to the verification implementation level item 2512 in the sub-dataset verification result 251 shown in FIG. 20 of the processed dataset and then terminates the processing (S2912). When there is no organization that can access the processed dataset as mentioned above, no distributed ledger node 22 is selected and the verification does not take place. Thus, it is possible to prevent the resources from being wasted.

On the other hand, when there is an organization that can access the processed dataset (S2915: YES), the client node 21 selects the distributed ledger node 22 of the organization that can access the processed dataset as a node (a second distributed ledger node) to input the data to the verification container (S2916). If the number of the distributed ledger nodes 22 serving as the destination of deployment exceeds the value in the parameter value item 2163 of the parameter item 2162 of the verification node (data input) maximum number in the verifying party determination parameter information 216 shown in FIG. 18, the client node 21 selects the maximum number of the distributed ledger nodes 22 while giving priority to the distributed ledger nodes 22 in the organizations which require less points (which are less costly), for example. Since the client node 21 takes account of the access rights of the organizations to the dataset when selecting the distributed ledger nodes 22 as described above, the client node 21 can select the distributed ledger nodes 22 to perform the verification processing while ensuring security of the data.

Next, the client node 21 adds the number of the selected distributed ledger nodes 22 to the verification implementation level item 2512 in the sub-dataset verification result 251 shown in FIG. 20 of the processed dataset (the sub-dataset) (S2917).

Subsequently, the client node 21 creates at least one combination of the distributed ledger node 22 as the destination of deployment of the verification container selected in S2913 and the distributed ledger node 22 to input the data to the verification container selected in S2916 (S2918). The method of creating the combination is not limited to a particular method. Here, if the number of the selected distributed ledger nodes 22 to input the data to the verification container is less than the number of the selected distributed ledger nodes 22 serving as the destination of deployment of the verification container, then one of the distributed ledger nodes 22 to input the data to the verification container is combined with two or more of the distributed ledger nodes 22 serving as the destination of deployment of the verification container.

Figure 30:
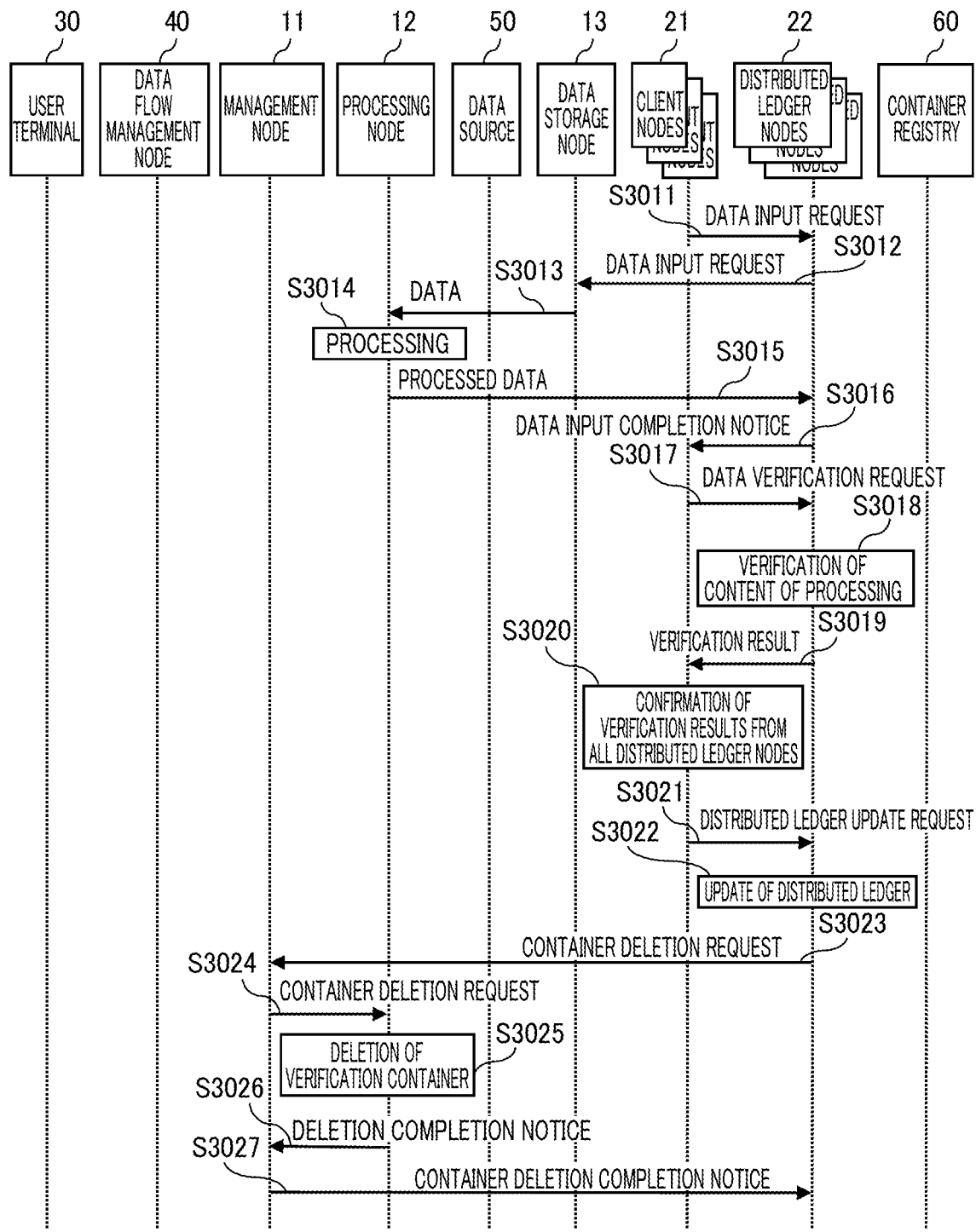
FIG. 30 is a sequence diagram to explain the verification processing on the content of the processing by the certain organization to be carried out by the data processing history management system when the data processing is performed by the certain organization.

FIG. 30 is a sequence diagram to explain the verification processing on the content of the processing of the data by the certain organization, which is to be carried out by the data processing history management system 1 when the data processing is performed by the certain organization.

First, the client node 21 requests the distributed ledger node 22 that takes up the data input, which is selected in the verifying party node selection processing S2816, to input the data (the input data in the data processing) to the verification container of the processing node 12 of the organization, to which the distributed ledger node 22 of the destination of deployment of the verification container combined with the former distributed ledger node 22 in S2918 belongs (S3011). Here, the request includes the dataset to be inputted and information (such as URL and an IP address) to specify whereabouts of the container of the destination of input.

Upon receipt of the request, the distributed ledger node 22 transmits the request for the input of the data to the verification container to the data storage node 13 that holds the data (the dataset) designated in the request (S3012).

The data storage node 13 inputs the data (the dataset) designated in the request to the verification container of the processing node 12 (S3013).

The verification container executes the processing as defined in the container on the inputted data (S3014) and transmits the processed data to the distributed ledger node 22 which transmits the request for deployment of the verification container (S3015). In this instance, the verification container may transmit the container log including the information concerning the content of the processing to the distributed ledger node 22.

Upon receipt of the processed data, the distributed ledger node 22 transmits the notice of completion to the client node 21 which requests the data input in S3011 (S3016).

Upon receipt of the notice of completion, the client node 21 requests the distributed ledger node 22 to verify the processed data (the output data) (S3017). This request includes the data processed in the processing S2813 in FIG. 28.

The distributed ledger node 22 verifies whether or not the content of the processing of the data by the certain organization is correct by comparing the processed data included in the request with the processed data received (from the verification environment) in S3015 (S3018), and notifies the client node 21 of a result of verification (S3019).

The client node 21 receives the results of verification from all the distributed ledger nodes 22 of the verifying parties and confirms the results (S3020). As a result of the confirmation, the client node 21 determines that the content of the processing (the content of the processing of a verification target) is correct when the results from a predetermined number or more of the distributed ledger nodes 22 out of the distributed ledger nodes 22 requested for the verification are identical, for example, and transmits a request for updating the distributed ledger (the sub-dataset verification result 251 shown in FIG. 20) to all the distributed ledger nodes 22 (S3021). Note that the method of determining whether or not the content of the processing is correct is not limited to the foregoing.

Upon receipt of the request, each distributed ledger node 22 updates the distributed ledger based on the content of the states (the sub-dataset verification result 251, the organization-retained point information 252, and the container log 253) (S3022) and requests the management node 11 to delete the verification container (S3023).

Upon receipt of the request, the management node 11 transmits the request for deletion of the verification container to the processing node 12 (S3024).

The processing node 12 deletes the designated verification container (S3025) and notifies the management node 11 of completion of deletion (S3026).

Upon receipt of the notice, the management node 11 notifies each distributed ledger node 22 of completion of the processing (S3027).

As described above, according to the data processing history management system 1 of this embodiment, it is possible to verify data processing performed by another organization by using a blockchain structure. Moreover, the processing targeted for the verification is performed by using resources of container platforms which are resources outside the blockchain. Thus, the content of the processing can be efficiently verified by using the exiting tools and the like. As described above, according to the data processing history management system 1 of this embodiment, it is possible to improve reliability of the data while efficiently achieving the structure for verifying the contents of data processing handled by two or more organizations.

While a certain embodiment of the present invention has been described above in detail, it is needless to say that the present invention is not limited to the above-described embodiment and various modifications are possible within the range not departing from the scope of the invention. For example, the embodiment has been described in details so as to facilitate the understanding of the present invention, and this description is not necessarily intended to include all the configurations explained above. In this context, it is possible to add other configurations to part of the configurations of the above-described embodiment or to delete or replace part of the configurations from the configurations of the above-described embodiment.

For example, the distributed ledger node 22 of the verifying party may be determined by using information on datasets used in the past by the respective organizations.

Meanwhile, part or all of the configurations, functional parts, processing parts, means of processing and the like described above may be realized in the form of hardware designed by use of an integrated circuit, for example. Alternatively, the above-mentioned configurations, functions, and the like described above may be realized in the form of software by causing a processor to interpret and execute programs for realizing the respective functions and the like. Information including programs, tables, files, and the like for realizing the respective functions may be installed in a storage device such as a memory, a hard disk, and a solid state drive (SSD) or in a storage medium such as an IC card, an SD card, and a DVD.

In the meantime, control lines and information lines that are considered to be necessary for the purpose of explanations are illustrated in the drawings. In this context, each of the drawings does not always illustrate all the control lines and all the information lines that are actually installed. For instance, almost all of the constituents therein may conceivably be coupled to one another in reality.

Moreover, a mode of layout of various functional parts, various processing parts, and various databases in each of the information processing apparatuses described above merely represents an example. The mode of layout of the functional parts, the processing parts, and the databases can be changed into an optimum mode of layout from the viewpoints of performances, processing efficiency, communication efficiency and the like of the hardware and the software included in these apparatuses.

In addition, a configuration (such as a schema) of a database to store the various data mentioned above can be flexibly modified from the viewpoints of efficient use of the resources, improvement in processing efficiency, improvement in access efficiency, improvement in search efficiency, and so forth.

What is claimed is:

1. An information processing system comprising:
   a plurality of distributed ledger nodes provided to a plurality of organizations, respectively, and configured to verify a content of a transaction with each other and to hold a history of the transaction in distributed ledgers provided to the organizations, respectively;
   a client node configured to transmit the transaction to the distributed ledger nodes; and
   a plurality of processing nodes provided to the plurality of organizations, respectively, and configured to execute verification target processing targeted for verification on a virtual platform in accordance with a data flow among the plurality of organizations;
   a data storage node configured to provide data to be used in the processing, wherein each distributed ledger node inputs the data provided from the data storage node to the verification target processing;
   wherein the client node selects first and second distributed ledger nodes to perform the verification of the verification target processing, and transmits the transaction including a request to execute the verification target processing to each of the selected first and second distributed ledger nodes;

the first distributed ledger node being configured to deploy the verification target processing, as a destination of transmission of the transaction including the request, and the second distributed ledger node is configured to input the data provided from the data storage node to the verification target processing as another destination of transmission of the transaction, and wherein each of the selected first and second distributed ledger nodes receives the transaction, and causes the processing node in the organization to which the first and second distributed ledger nodes are provided, to perform the verification of the verification target processing by executing the verification target processing on the virtual platform, and records a result of the verification in the distributed ledger.

2. The information processing system according to claim 1, wherein the data storage node controls access of each of the organizations to the provided data, and the client node selects the distributed ledger node of the organization that can access the data to be inputted to the verification target processing as a destination of transmission of the transaction including the request to execute the verification target processing.

3. The information processing system according to claim 1, wherein the client node selects the distributed ledger node of the organization being different from the organization to which the client node belongs and using the data processed in the verification target processing in the data flow, as a destination of transmission of the transaction including the request to execute the verification target processing.

4. The information processing system according to claim 1, wherein the client node selects the distributed ledger node of the organization that can access the data to be inputted to the verification target processing as the second distributed ledger node.

5. The information processing system according to claim 1, wherein the client node sets a quantity of destinations of transmission, each selected as the destination of transmission of the transaction including the request to execute the verification target processing, to the transaction as a verification implementation level being an evaluation index to represent a quality of the verification, and each distributed ledger node records the verification implementation level in the distributed ledger.

6. The information processing system according to claim 1, wherein each distributed ledger includes records of values of points retained by the respective organizations, and the distributed ledger node increases the value of points of the organization to which the distributed ledger node belongs, the value being recorded in the distributed ledger.

7. The information processing system according to claim 6, wherein the client node stores values of points required for the respective organizations to execute the verification, and the client node selects the distributed ledger node of any of the organizations while giving priority to the organization which requires less points, as the destination of transmission of the transaction including the request to execute the verification target processing.

8. A method of controlling an information processing system including a plurality of distributed ledger nodes provided to a plurality of organizations, respectively, and configured to verify a content of a transaction with each other and to hold a history of the transaction in distributed ledgers provided to the organizations, respectively, a client node configured to transmit the transaction to the distributed ledger nodes, and a plurality of processing nodes provided to the plurality of organizations, respectively, and configured to execute verification target processing targeted for verification on a virtual platform in accordance with a data flow among the plurality of organizations, the method comprising the steps of:

causing the client node to select the first and second distributed ledger nodes to perform the verification of the verification target processing and to transmit the transaction including a request to execute the verification target processing to each of the selected first and second distributed ledger nodes;

the first distributed ledger node being configured to deploy the verification target processing, as a destination of transmission of the transaction including the request, and the second distributed ledger node being configured to input data provided from a data storage node to the verification target processing as another destination of transmission of the transaction, and causing each of the selected first and second distributed ledger nodes, upon receipt of the transaction, to cause the processing node in the organization to which each of the first and second distributed ledger node belongs, to perform the verification of the verification target processing by executing the verification target processing on the virtual platform and to record a result of the verification in the distributed ledger.

9. The method of controlling an information processing system according to claim 8, wherein the information processing system further includes a data storage node configured to provide data to be used in the processing, and the method further includes the step of causing each distributed ledger node to input the data provided from the data storage node to the verification target processing.

10. The method of controlling an information processing system according to claim 9, further comprising the steps of:

causing the data storage node to control access of each of the organizations to the provided data; and causing the client node to select the distributed ledger node of the organization that can access the data to be inputted to the verification target processing as a destination of transmission of the transaction including the request to execute the verification target processing.

* * * * *